US007844098B2

(12) United States Patent
Liu et al.

(10) Patent No.: US 7,844,098 B2
(45) Date of Patent: Nov. 30, 2010

(54) METHOD FOR PERFORMING COLOR ANALYSIS OPERATION ON IMAGE CORRESPONDING TO MONETARY BANKNOTE

(75) Inventors: Xu-Hua Liu, Beijing (CN); Chung-Chieh Kuo, Taipei (TW); Young-Min Kwak, Gardena, CA (US); Ying-Jieh Huang, Taipei County (TW)

(73) Assignee: Primax Electronics Ltd., Neihu, Taipei (TW)

( * ) Notice: Subject to any disclaimer, the term of this patent is extended or adjusted under 35 U.S.C. 154(b) by 277 days.

(21) Appl. No.: 12/176,415

(22) Filed: Jul. 21, 2008

(65) Prior Publication Data

US 2010/0014742 A1 Jan. 21, 2010

(51) Int. Cl.
*G06K 9/00* (2006.01)

(52) U.S. Cl. ...................................... 382/138; 382/165

(58) Field of Classification Search ................. 194/206; 382/103, 135, 137, 138, 164, 165, 175, 178, 382/325; 434/110
See application file for complete search history.

(56) References Cited

U.S. PATENT DOCUMENTS

| | | | | | |
|---|---|---|---|---|---|
| 4,823,393 | A | * | 4/1989 | Kawakami | 382/135 |
| 5,696,594 | A | | 12/1997 | Saito | |
| 5,790,693 | A | * | 8/1998 | Graves et al. | 382/135 |
| 5,992,601 | A | | 11/1999 | Mennie | |
| 6,771,813 | B1 | | 8/2004 | Katsuyama | |
| 7,209,582 | B2 | | 4/2007 | Takahashi | |
| 7,362,423 | B2 | | 4/2008 | Masten | |
| 7,362,891 | B2 | * | 4/2008 | Jones et al. | 382/135 |
| 7,366,337 | B2 | * | 4/2008 | Kortum et al. | 382/135 |
| 2003/0121753 | A1 | | 7/2003 | Stromme et al. | |
| 2004/0247169 | A1 | * | 12/2004 | Ross et al. | 382/137 |
| 2007/0154079 | A1 | * | 7/2007 | He et al. | 382/135 |
| 2008/0069427 | A1 | * | 3/2008 | Liu et al. | 382/137 |

* cited by examiner

*Primary Examiner*—Bhavesh M Mehta
*Assistant Examiner*—Stephen R Koziol
(74) *Attorney, Agent, or Firm*—Winston Hsu; Scott Margo

(57) ABSTRACT

A method for performing a color analysis operation on an image corresponding to at least a monetary banknote is provided. The method comprises: dividing the image into a plurality of blocks; performing a block analysis operation on each block of the image to generate a block analysis result of each block; performing a super-block analysis operation on each super-block of the image to generate a super-block analysis result of each super-block, wherein each super-block includes more than one block; and performing a global analysis operation on the image to identify a currency type of the monetary banknote according to super-block analysis results of super-blocks of the image.

9 Claims, 7 Drawing Sheets

METHOD FOR PERFORMING COLOR ANALYSIS OPERATION ON IMAGE CORRESPONDING TO MONETARY BANKNOTE

BACKGROUND OF THE INVENTION

1. Field of the Invention

The present invention relates to an image processing method, and more particularly, to a method for performing a color analysis operation.

2. Description of the Prior Art

Automated identification and verification of known currency bills is a practical application when applied to retail and business environments. Electronic verification of known bill types helps to increase security in monetary transactions, and also prevents vendors from receiving counterfeit currencies. The currency detectors available today typically scan an image of a sample currency, from which a series of tests is performed in order to determine the validity of the sample. The tests used can include the identification of known currency sections or landmarks, holograms, reflective areas, printing patterns, and texture patterns.

Improvements in graphics and image duplication systems, which can include scanners, digital color copiers, and printing machinery and apparatuses, has also contributed to the increase in illegal counterfeit reproduction of various items. Counterfeiters nowadays commonly attempt to reproduce monetary banknotes such as currencies, stocks, bonds, and other valuable items for personal gain and profit. The task of distinguishing and discerning between legitimate items and copied fakes is becoming increasingly difficult as printing and reproduction improvements allow copiers to reproduce banknotes that are virtually identical to legitimate ones. Therefore, there is a need to be able to effectively and precisely discern and distinguish monetary banknotes from authentic ones.

In addition to the increasing difficulties in identifying legitimate currency bills, one more problem is the desire to scan sample currencies from images that are larger than the sample currency being scanned. However, doing this introduces more problems as the bills may be presented on arbitrary backgrounds, and may have variations in shift and rotation. Many currency detectors today generally only scan one bill at a time, and only scan the immediate area of the bill in order to omit the need to consider the background, rotation, and alignment of the bill. In addition, if the note is scanned while embedded with a complicated image background, it may be very difficult to distinguish the actual note from the image background. The image background may also provide additional noise and/or patterns to complicate the detection process and introduce irregularities and errors. It is needless to say that without the proper identification of a currency note from its image background, while having various offsets and rotations, optimal conditions for accurate currency detection can not be met.

SUMMARY OF THE INVENTION

It is therefore one of the objectives of the present invention to provide a method for performing a color analysis operation on an image corresponding to at least a monetary banknote, so as to solve the above problem.

In accordance with an exemplary embodiment of the claimed invention, a method for performing a color analysis operation on an image corresponding to at least a monetary banknote is disclosed. The method comprises: dividing the image into a plurality of blocks; performing a block analysis operation on each block of the image to generate a block analysis result of each block; performing a super-block analysis operation on each super-block of the image to generate a super-block analysis result of each super-block, wherein each super-block includes more than one block; and performing a global analysis operation on the image to identify a currency type of the monetary banknote according to super-block analysis results of super-blocks of the image.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
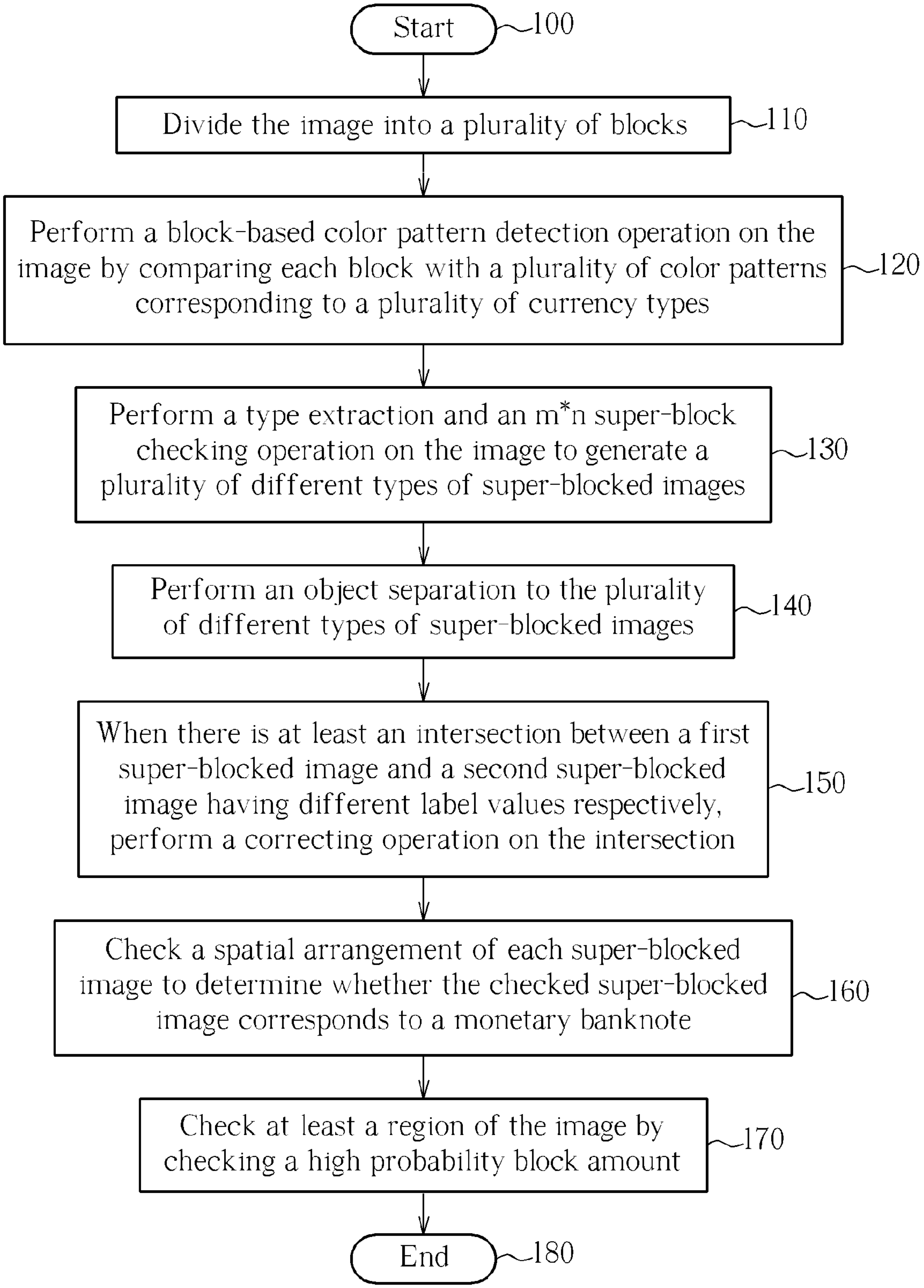
FIG. 1 is a flowchart of a method for performing the color analysis operation on the image corresponding to the monetary banknote in accordance with an embodiment of the present invention.

The present invention relates to a method for performing a color analysis operation, and this document will describe several exemplary embodiments that apply the method of the present invention. However, a person of average skill in the pertinent art should understand that the present invention can be applied to various types of monetary banknotes and is not limited to the particular embodiments described in the following paragraphs or to the particular manner in which any features of such embodiments are implemented.

In general, the method of the present invention can be applied to all kinds of monetary banknotes. For example, the method of the present invention can be applied to European currency, Chinese currency, Taiwanese currency, American currency, and Japanese currency. However, this is only for illustrative purposes and is not meant to be a limitation of the present invention. In addition, under conditions not affecting the technical disclosure of the present invention, European currency, Chinese currency, Taiwanese currency, American currency, and Japanese currency will be used in this document as examples to illustrate the operation principles of the method according to the present invention.

The present invention contained herein provides a method for performing a color analysis operation on an image corresponding to the monetary banknote. The image can be provided from a hardware scanner or a similar device, where the image can contain sample monetary banknotes of a predetermined currency type. The types of currencies can include European, Chinese, Taiwanese, American, and Japanese currencies, but additional embodiments can also include currencies of other nationalities.

The described method can be applied for preventing the counterfeiting of currency. The scanned image can provide the sample monetary banknotes with an arbitrary rotational shift alignment within the image. This allows a common scanner to be used, instead of a simple banknote reader with fixed input dimensions. Additionally, the scanned image can contain the sample monetary banknotes while superimposed onto an arbitrary background, can contain multiple isolated or independent banknotes, or have overlapping banknotes. The method can be used in conjunction with basic stand-alone scanners, copiers, stand-alone printers, and other related detection and scanning hardware.

The method described in this present invention makes use of new innovations not introduced by the prior art. This not only provides an increased means of security measures when used for anti-counterfeit banknote, it also provides ease of integration with common hardware devices and a viable low-cost approach. It is also robust and flexible enough to be applied to a wide variety of image types and conditions.

Prior to a concise description of the present invention verification method, it is important to understand that certain terms used throughout the following description and claims will refer to particular processes or steps. As one skilled in the art will appreciate, designers may refer to such processes by different names. This document does not intend to distinguish between items that differ in name but function. In the following discussion and in the claims, the terms “including” and “comprising” are used in an open-ended fashion, and thus should be interpreted to mean “including, but not limited to . . . ”. Other examples are equally applicable, and should be understood to those familiar with the proper terminology of the related art.

Please refer to FIG. 1. FIG. 1 is a flowchart of a method for performing the color analysis operation on the image corresponding to the monetary banknote in accordance with an embodiment of the present invention. Provided that substantially the same result is achieved, the steps of process need not be in the exact order shown and need not be contiguous: other steps can be intermediate. The present invention method comprises:

Step 100: Start.

Step 110: Divide the image into a plurality of blocks.

Step 120: Perform a block-based color pattern detection operation on the image by comparing each block with a plurality of color patterns corresponding to a plurality of currency types.

Step 130: Perform a type extraction and an m*n super-block checking operation on the image to generate a plurality of different types of super-blocked images.

Step 140: Perform an object separation to the plurality of different types of super-blocked images.

Step 150: When there is at least an intersection between a first super-blocked image and a second super-blocked image having different label values respectively, perform a correcting operation on the intersection.

Step 160: Check a spatial arrangement of each super-blocked image to determine whether the checked super-blocked image corresponds to a monetary banknote.

Step 170: Check at least a region of the image by checking a high probability block amount.

Step 180: End.

The Step 120 belongs to a block analysis operation. The Step 130 belongs to a super-block analysis operation. The Step 140, the Step 150 and the Step 160 belong to a global analysis operation. In the Step 130, the type extraction process is performed by checking a corresponding bit of every non-zero block. For example, an 8×8 super-block checking is done by checking how many true blocks of the same type in an 8×8 super-block to set its value as 1 or 0 in the super-blocked image of this type. If most of the blocks in the super-block fall into one type, then this super-block is set as 1 in the super-blocked image of this type.

Figure 2:
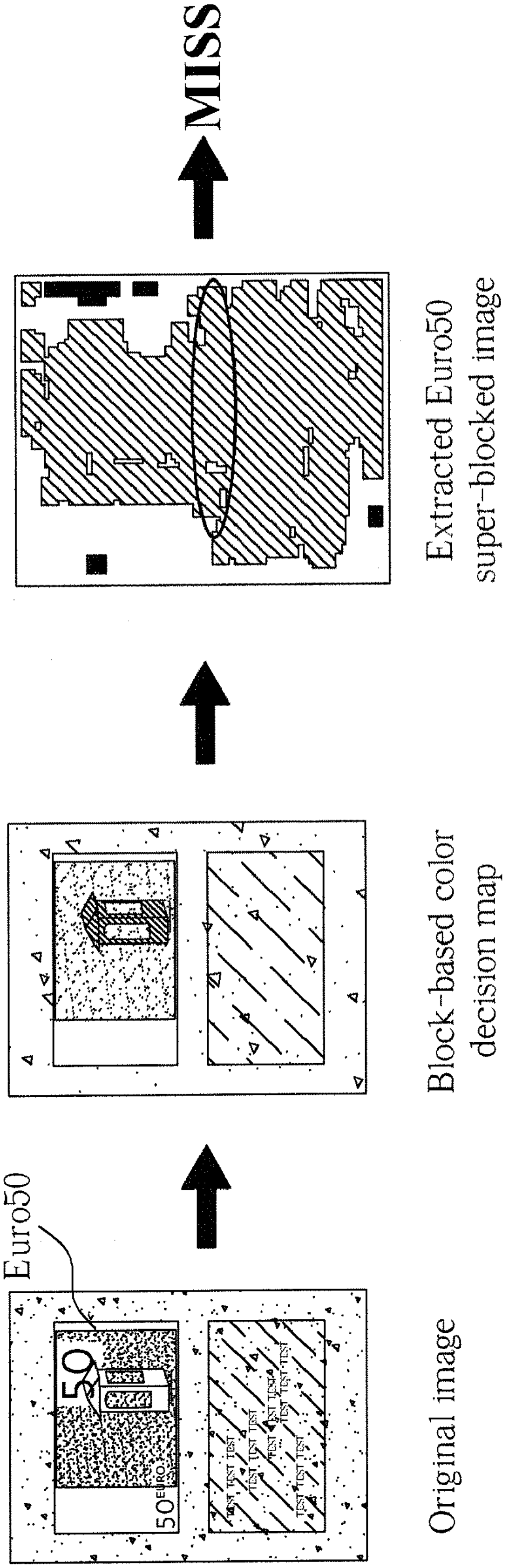
FIG. 2 illustrates a miss problem when performing a color analysis operation on the image corresponding to a monetary banknote.

Please refer to FIG. 2. FIG. 2 illustrates a miss problem. The miss problem is because too many innocent blocks around the bill are recognized as Euro block due to small 8×8 block analysis. Then the lower object is connected with the upper Euro object in the extracted Euro50 super-block image. The super-block size is 8×8 and the offset is 2. The possible solutions are to filter more innocent blocks when extracting each type of super-block image. Thus, the block variance range of Y channel of each bill type is trained and set the threshold when extracting each block from the blocked image. The strategy can successfully exclude some innocent blocks when extracting a specific type of super-block image. Thus, this kind of miss detection can be solved.

Figure 3:
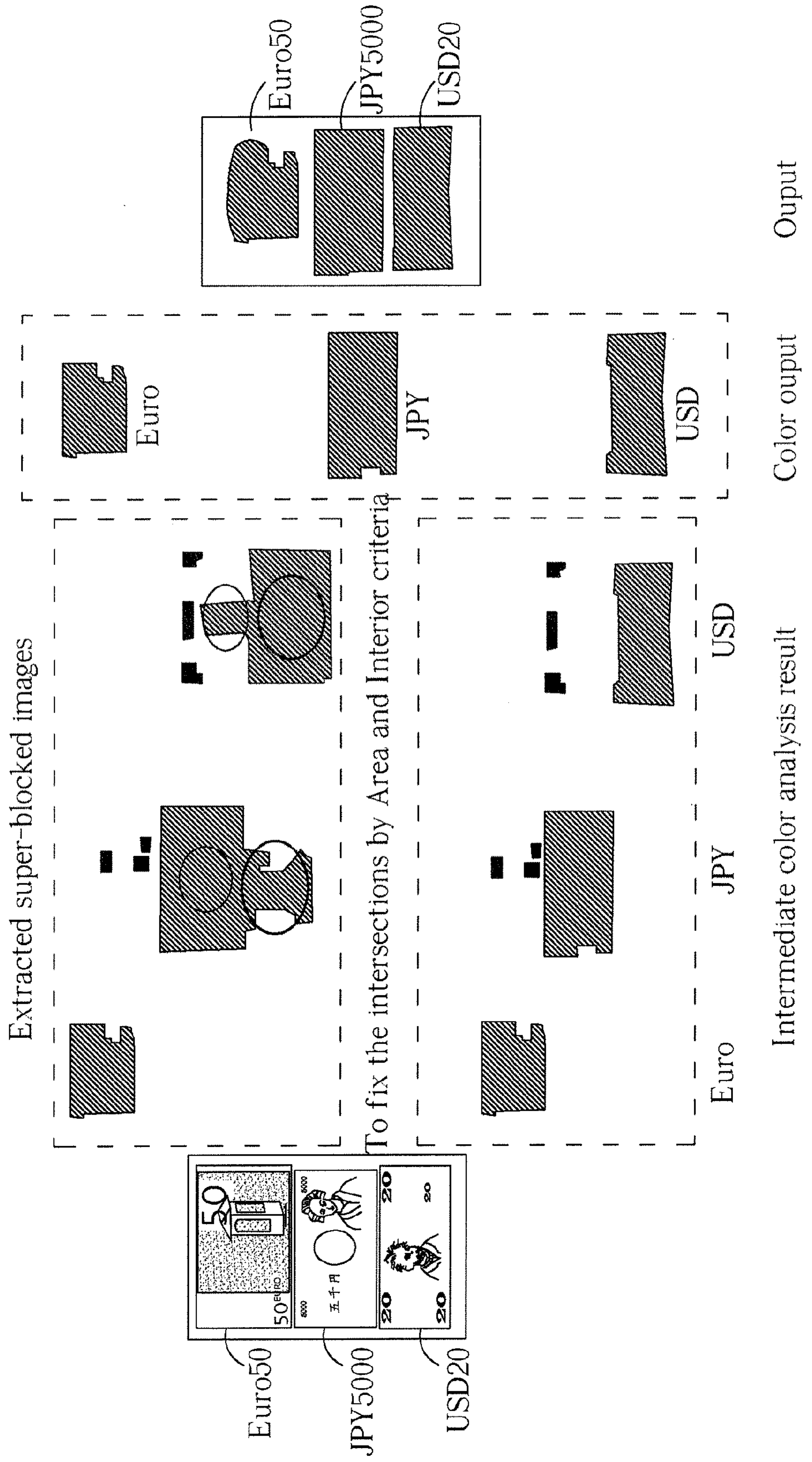
FIG. 3 illustrates the super-block analysis operation in accordance with an embodiment of the present invention.

Please refer to FIG. 3. FIG. 3 illustrates the super-block analysis operation in accordance with an embodiment of the present invention. In the Step 130, for each super-block, when most of blocks in the super-block correspond to a specific currency type, the super-block is determined to belong to the specific currency type. Next, in the Step 140, the present invention method performs an object separation upon the three super-blocked images corresponding to super-blocks having an identical currency type, respectively (i.e., Euro, JPY, and USD). Next, in Step 150, the correcting operation for the intersection comprises: determining whether the intersection block is an interior block of any of the two regions; if the intersection block is an interior block of any of the two regions, then assigning the block to the region around it; if the intersection block is the exterior block to both of the two regions or boundary block of the two regions or all else, then assigning the block according to the area criterion (that is, assigning the block to the region that has larger area).

Figure 4:
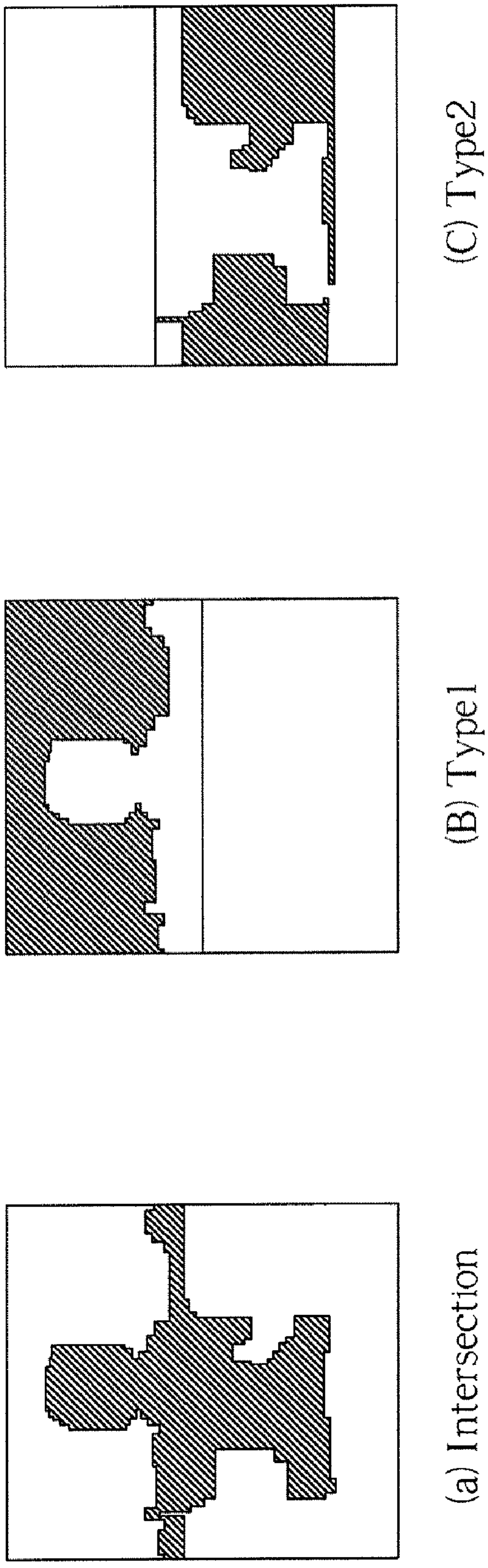
FIG. 4 shows the example of the above separation to the intersection of JPY and USD in FIG. 3.

To determine the interior, a simple algorithm is used. At first the intersection with the same labels are extracted and the intersection is removed from the two super-block images. Please refer to FIG. 4. FIG. 4 shows the example of the above separation to the intersection of JPY and USD in FIG. 3. The four corners coordinates of the two super-blocked images are located respectively using zero degree scanning and zig-zag scanning. The region can be a concave polygon, but as the most outer four corners can always be found, the region can be regarded as a convex polygon. The relationship between a point and a convex polygon can be determined by the following algorithm.

Figure 5:
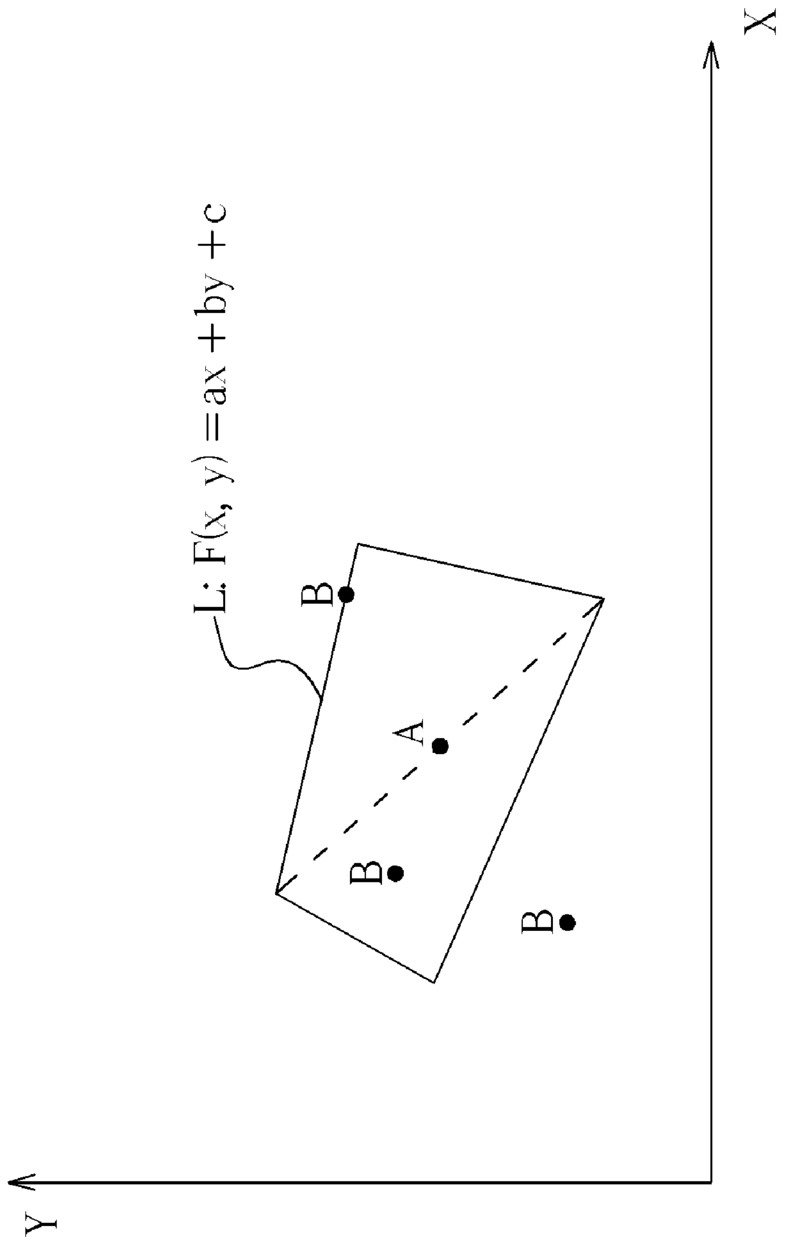
FIG. 5 illustrates the algorithm of determining the interior.

Please refer to FIG. 5. FIG. 5 illustrates the algorithm. Supposing an arbitrary A point in the polygon, which can simply be the mid-point of one diagonal line, if the point to be determined B is always at the same side of all the boundary lines with A, then B is an interior point of the polygon. In details, supposing the boundary line L function $$F(x,y)=ax+by+c,$$

if $F(A)\times F(B)>0$, A and B are at the same side of L;

if $F(A)\times F(B)=0$, B is on the boundary line L;

if $F(A)\times F(B)<0$, B is outside of the polygon. If for the four boundary lines, there always are $F(A)\times F(B)>0$, then B is in the polygon.

Figure 6:
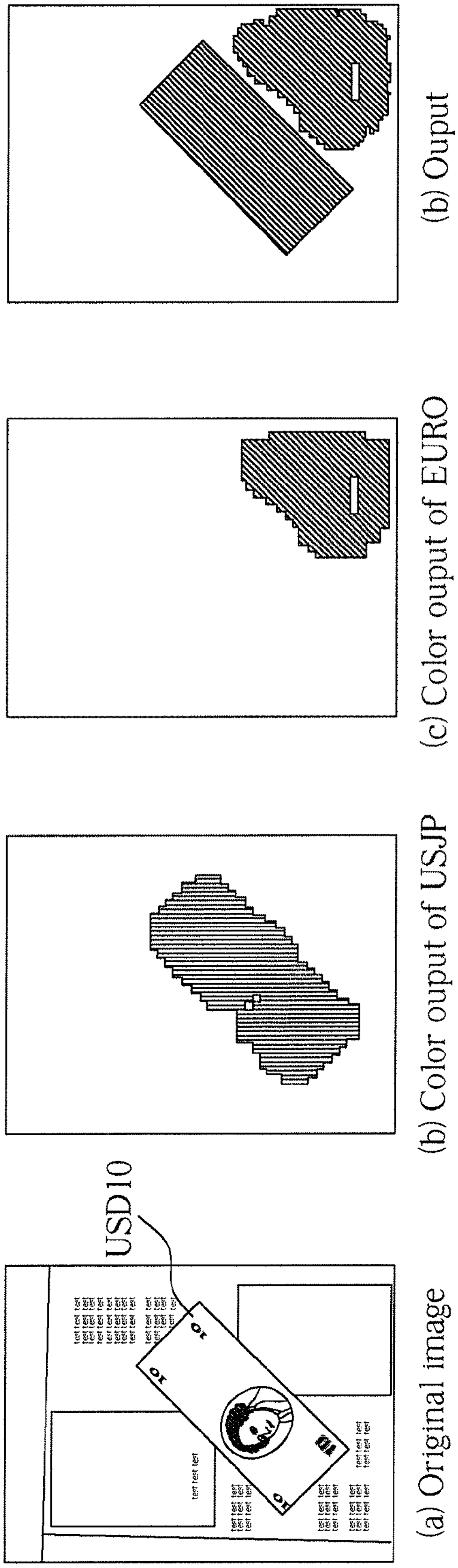
FIG. 6 shows a problem of false alarm area where most of whose block patterns are bill ones but the detected bill pattern amount is not similar to that of the real bill.

After using the above algorithm to correct the intersection, the problem is solved as shown in FIG. 3. Next, in the Step 160, sometime there is one kind of false alarm area where most of whose block patterns are bill ones but the detected bill pattern amount is not similar to that of the real bill. Please refer to FIG. 6. FIG. 6 shows one example of this kind of problem. If zooming in the original image and tracing the color pattern in those false alarm area in EURO output, it only occupies a few color patterns in the look-up table. However, if less spatial information of the bill image is considered, this kind of false alarm cannot be avoided if the area of the region is large enough. Thus, the present invention method considers the spatial information of the suspicious region, that is, to consider the diversity of block patterns, sort of spatial arrangement.

To get the suspicious region diversity of color pattern, in the block-based process, the suspicious color pattern is saved to a 2D array. The first dimension is for the block location, and the second dimension is for the color pattern components, that is, Ymedian, Cbmedian, and so on. Note that all the innocent patterns are recorded as pattern [0][0][0][0][0][0]. Then after removing the small object according to area checking, the patterns belonging to the certain bill type in each suspicious object of each super-blocked image are counted to get the amount of bill patterns. Then the region pattern diversity is got by (pattern amount/region area). For example, after block-based color pattern matching, the result will be checked by each type. To those blocked images, each Euro blocked image will be checked by its color pattern diversity. When checking type A, only those patterns belonging to type A will be considered as suspicious ones and counted into pattern amount. It can ensure that there is little change to the diversity statistics of type A when the present invention method only modifies the look-up table for type B and make this approach robust. According to this statistics, those regions with too uniform pattern or too fancy pattern can be excluded.

Figure 7:
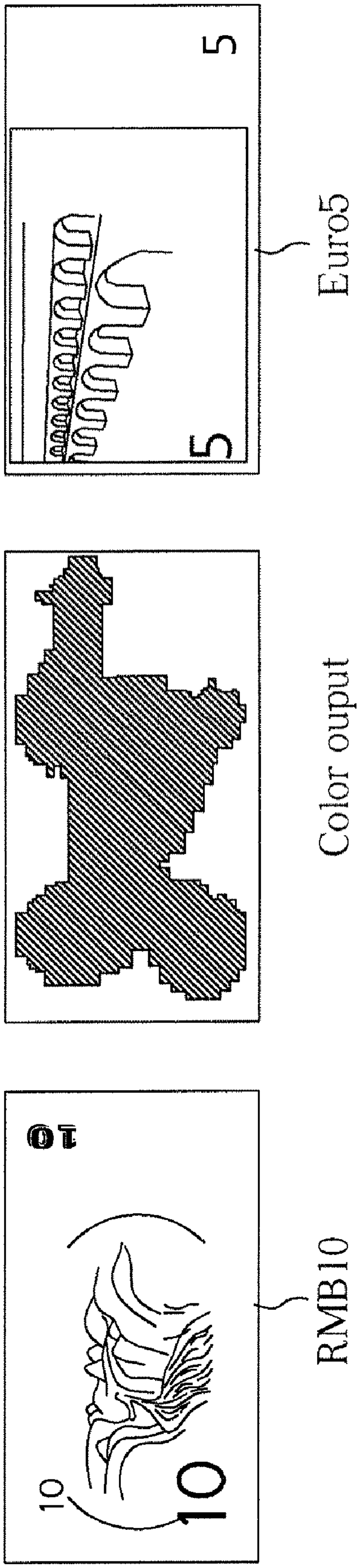
FIG. 7 shows a false detection result.

In addition, the present invention method can further comprise a Step 170 of checking at least a region of the image by checking a high probability block amount. The Step 170 is developed regarding to the false detection result shown in FIG. 7. Since there are some similar colors between RMB10 and Euro5, and when a small block size, e.g. 8×8, is used for a down-sampled low resolution color image, a lot of RMB10 blocks are detected as Euro suspicious blocks. Thus, after the followed regional check steps the suspicious region is finally detected as Euro Unfortunately. However, when carefully comparing the small similar blocks between RMB10 and Euro5, it is able to find out that the colors are similar but not the same. So the similarity degree can be considered through the highly similar super-block amount in the whole image and in the individual suspicious region. The highly similar super-block is defined as the amount of same type of blocks in the look-up table is more than a value (e.g. 50, and the super block size is 8×8). This threshold is different among different currency types defined in the bit-wise definition. The false detection problem of RMB can be solved after the processing of the Step 170.

After the above block-level, super-block level and regional level color analysis, we can confidently to figure out the currency type of the suspicious region as the region of certain type has been verified.

Please note that the above embodiments are only for illustrative purposes and are not meant to be limitations of the present invention. Briefly summarized, use of the present invention method not only provides an increased means of security measures when used for banknote detection in order to prevent from counterfeiting, it also provides ease of integration with common hardware devices and a viable low cost approach. Accurate detection rates with low false detection frequencies can therefore be attained. The method is also robust and flexible enough to be applied to different image types and conditions.

Those skilled in the art will readily observe that numerous modifications and alterations of the device and method may be made while retaining the teachings of the invention.

What is claimed is:

1. A method for performing a color analysis operation on an image corresponding to at least a monetary banknote, the method comprising:

dividing the image into a plurality of blocks;

performing a block analysis operation on each block of the image to generate a block analysis result of each block;

performing a super-block analysis operation on each super-block of the image to generate a super-block analysis result of each super-block by a hardware imaging device, wherein each super-block includes more than one block; and performing a global analysis operation on the image to identify a currency type of the monetary banknote according to super-block analysis results of super-blocks of the image;

wherein the step of performing the super-block analysis operation on each super-block of the image comprises:

for each super-block:

when detecting that most of blocks in the super-block correspond to a specific currency type, determining that the super-block has the specific currency type.

2. The method of claim 1, wherein the step of performing the block analysis operation on each block of the image comprises:

performing a block-based color pattern detection operation on the image by comparing each block with a plurality of color patterns corresponding to a plurality of currency types.

3. The method of claim 2, wherein the step of performing the super-block analysis operation on each super-block of the image comprises:

performing an object separation upon at least a super-blocked image corresponding to super-blocks having an identical currency type.

4. The method of claim 1, wherein the super-blocked image corresponding to super-blocks having the identical currency type is labeled by a label value, and the step of performing the global analysis operation on the image comprises:

when there is at least an intersection between a first super-blocked image and a second super-blocked image having different label values respectively, performing a correcting operation on the intersection.

5. The method of claim 4, wherein the step of performing the global analysis operation on the image further comprises:

checking a spatial arrangement of each super-blocked image to determine whether the checked super-blocked image corresponds to a monetary banknote.

6. The method of claim 4, wherein the intersection comprises blocks in the first super-blocked image that correspond to a first currency type and blocks in the second super-blocked image that correspond to a second currency type, and the step of performing the correcting operation on the intersection comprises:

determining that a part of the blocks in the second super-blocked image corresponding to an interior of the first super-blocked image belongs to the first currency type; and determining that a part of the blocks in the first super-blocked image corresponding to an interior of the second super-blocked image belongs to the second currency type.

7. The method of claim 1, wherein the step of performing the global analysis operation on the image further comprises:
checking a spatial arrangement of each super-blocked image to determine whether the checked super-blocked image corresponds to a monetary banknote.

8. The method of claim 1, wherein the step of performing the global analysis operation on the image further comprises:
checking at least a region of the image by checking a block amount of super-blocks each having an amount of a same type of blocks in the region that is more than a value.

9. The method of claim 1, wherein the monetary banknote comprises European currency, Chinese currency, Taiwanese currency, United States of America currency, and Japanese currency.

* * * * *